United States Patent [19]

Hartman et al.

[11] 4,408,832
[45] Oct. 11, 1983

[54] MIRROR ADJUSTING FIXTURE

[75] Inventors: Paul R. Hartman; Thomas B. Milam, both of Jupiter, Fla.

[73] Assignee: United Technologies Corporation, Hartford, Conn.

[21] Appl. No.: 328,298

[22] Filed: Dec. 7, 1981

[51] Int. Cl.³ .......................... G02B 7/18; G02B 5/08; H01L 41/08
[52] U.S. Cl. .................................. 350/310; 350/295; 350/487; 310/328
[58] Field of Search ................ 350/310, 295, 289, 487

[56] References Cited

U.S. PATENT DOCUMENTS

| 3,902,085 | 8/1975 | Bizzigotti | 310/328 |
| 3,952,215 | 4/1976 | Sukitani | 310/328 |
| 4,202,605 | 5/1980 | Heinz | 350/310 |
| 4,295,710 | 10/1981 | Heinz | 350/310 |

*Primary Examiner*—Jon W. Henry
*Attorney, Agent, or Firm*—Eric W. Petraske

[57] ABSTRACT

An adjusting mechanism for a deformable mirror includes a piezoelectric stepping section to position the apparatus within a guarding tube, a piezoelectric displacing device for dynamically moving a mirror surface and a piezoelectric clamp to grip a guide projecting from the rear of the mirror.

1 Claim, 3 Drawing Figures

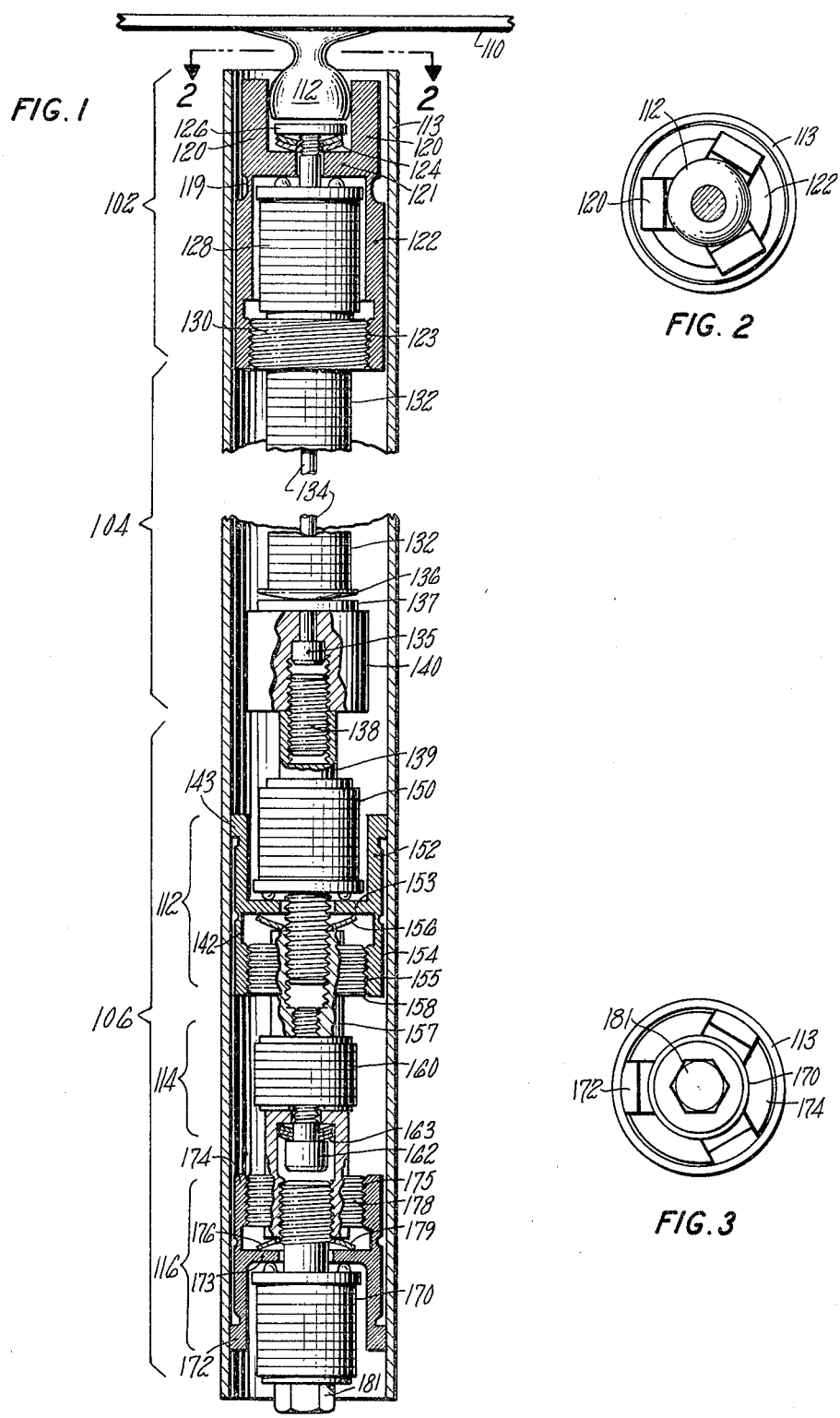

MIRROR ADJUSTING FIXTURE

DESCRIPTION

TECHNICAL FIELD

The field of the invention is that of devices for adjusting a deformable mirror in an adaptive optical system.

BACKGROUND ART

U.S. Pat. No. 3,390,559 issued to O. M. Steutzer on July 2, 1968 illustrates a lock effectuated by a round piezoelectric clamp having a circular cross section for the internal gripping of a lock cylinder. This gripping device must have a good match with the interior of the tube in order to exert a substantial frictional force between the outside of the piezo cylinder and the interior surface of the tube.

U.S. Pat. No. 3,952,215 issued to Y. Sakitani on Apr. 20, 1976 discloses a device for adjusting a holder for microscope specimens in which stepwise adjustment is provided by sequential activation of a set of piezoelectric pieces. The adjusting device is held in position by electrostatic force between a dielectric plate and a base plate.

DISCLOSURE OF INVENTION

The invention relates to a device for adjusting the static position of a deformable mirror by means of a piezoelectric stepping mechanism and for manipulating the position of the deformable mirror dynamically in response to control signals. Connection of the adjusting mechanism with the mirror is provided by a piezoelectric controlled gripping clamp.

BRIEF DESCRIPTION OF DRAWINGS

FIG. 1 illustrates an embodiment of the invention;

FIG. 2 illustrates a cross section of the embodiment of FIG. 1;

FIG. 3 illustrates a bottom view of the embodiment of FIG. 1.

BEST MODE FOR CARRYING OUT THE INVENTION

Certain laser systems include a deformable mirror to control the laser beam as part of an adaptive optical control system. As is known in the art, some deformable mirrors are adjusted to a desired optical surface configuration by pushing or pulling on the rear surface of a thin plate supporting the optical surface. In prior art deformable mirrors, the force for the static position of the mirror has been provided by manual adjustment of threaded rods, and the dynamic control of the mirror for an adaptive optical system has been provided by a stack of piezoelectric elements which respond to control signals to superimpose additional force on the static force. A chronic problem in setting up the initial condition of the mirror has been that of breaking off the threaded or attachment members. A further problem has been that of adjusting the mirror along a direction essentially perpendicular to the plane of the mirror without exerting any moment or twisting force on the mirror.

In FIG. 1, projecting member 112 having a generally spherical shape is gripped by three equally spaced prongs 120 which are controlled by piezoelectric stack 128. The advantage of the three-prong method of gripping a spherical object is that it substantially reduces the danger of imparting a twist or moment during the adjusting process. Dynamic force in response to control signals is applied by body unit 104 acting through conventional stack 132 of piezoelectric elements. Positioning of the adjusting device to provide a static mirror surface configuration is accomplished by stepping mechanism 106 at the end of the device, in which clamping units 112 and 116 grip the interior surface of tube 113 to provide resistance to the static force and, together with moving unit 114, are energized in sequence to move the device as a whole within the interior of tube 113. Tube 113 is supported by a conventional framework not shown in the drawing, which also supports a number of other tubes for holding similar adjusting devices. The number of adjusting devices and their spacing will, of course, depend on the particular system requirements.

In more detail, gripping energizer 128, in response to an applied voltage transmitted by wires not shown, expands, pressing against levers 121 of prongs 120. This lever action bends prong 120 at reduced cross-sectional position 119 and so bends prong 120 outwards from projecting member 112, thereby releasing the gripping force. Restoring force is applied by Belleville springs 124 pressing against legs 121 of prongs 120 against member 126, the head of a shaft extending through energizer 128. The three gripping prongs 120 extend upwards from cylindrical member 122 which is connected to threaded member 130 through threads 123. Cylindrical member 122 is sized to pass freely through the interior of tube 113. The use of threads to attach the cylindrical member to the base of the energizer is not essential to the invention and other methods of attachment will be evident to those skilled in the art.

Below gripping unit 102, piezoelectric stack 132 serves to exert time-varying force on the mirror in response to signals from a conventional adaptive optical control system, as is well known to those skilled in the art. This central body member 104 is formed of piezo stack 132 connected to gripping member 102 by means of shaft 134 terminating in bolt head 135. Limited angular freedom is provided by spherical washer 136 and flat washer 137. Adapting member 140 serves to connect body portion 104 with stepping unit 106, the attachment being made in the illustrative embodiment by threaded rod 138 attached to member 139.

The stepping unit 106 serves to replace the prior art threaded rods and to remove the problem of twisting off these rods. It comprises gripping portions 112 and 116 and central expanding portion 114. The interior of tube 113 is gripped by three prongs 143 of unit 112, which are pressed against the interior wall of tube 113 by the action of Belleville spring 156 pressing against lever arm 153. Prongs 143 are sized to extend outwardly further than the central portion 152 of the gripping member. The action of this interior gripping device is analogous to that of the gripping member at the top of the device, in that Belleville spring 156 exerts a substantial pressure on the interior wall of tube 113 (through prongs 143) and this pressure is relieved by the extension of piezoelectric stack 150 which presses downwardly on lever 153, thus freeing the device to pass through the interior of the tube. Gripping prongs 143 are attached to the central portion of the stepping mechanism by threads 155 located on the interior surface of cylindrical portion 154 and connected to threaded member 158.

At the opposite end of the stepping section, a counterpart gripping unit 116 comprises piezoelectric energizer 170 which presses against levers 173 to relieve prongs 172, these prongs being attached to cylindrical member 174 which is connected to threaded member 178 by threads 175. The whole gripping unit is fastened together by bolt 179 having bolt head 181.

Travel along the axis of tube 113 is provided by the action of traveling unit 114, including piezoelectric stack 160 which extends and contracts axially in response to applied control signals. Stack 160 is penetrated by bolt 162 and has compressive force applied by Belleville springs 163.

In operation, one of the gripping units is released and the second one is held fast while stack 160 is energized to expand. The result is that the first gripping unit extends further along the axis of the tube by the amount of the expansion of member 160. The energizer of the first gripping unit is then switched off so that its prongs grip the tube, the second gripping unit is energized to release its grip and the voltage on stack 160 is turned off, thereby shrinking the stack and moving the second gripping unit in the same direction as the first unit. After stack 160 has contracted, both gripping units are deenergized and the device is held fast within the tube in a new position which differs axially from the former position by the amount of the extension of member 160. Repeated application of this sequence results in the device as a whole traversing through the interior of the tube. The device will travel in either direction, depending on the energizing sequence.

FIG. 2 shows a cross section through section 2—2 of FIG. 1 showing effectively a top view of the gripping unit, in which prongs 120 grip the outer surface of the spherical portion of member 112. The relation between prongs 120, cylindrical member 122 can more clearly be seen in this view.

FIG. 3 shows the embodiment of FIG. 1 in a bottom view showing bolt head 181, prongs 172 and cylindrical member 174.

We claim:
1. An adjusting device for applying force along an axis to a projecting member affixed to the rear surface of a deformable mirror comprising:

a support tube directed substantially along said axes and having a cylindrical interior surface, gripping means having three prongs for gripping said projecting member, said prongs being released in response to movement of a first piezoelectric actuator, dynamic piezoelectric actuator means for applying temporally variable force to said deformable mirror in response to control signals, said force being transmitted to said mirror along said axis and through said gripping means;

stepping and positioning means connected to said dynamic actuator means for moving said dynamic actuator means and said gripping means through said tube along said axis from a first position to a second position, said stepping and positioning means further including first and second locking means spaced apart axially and having first and second sets of three locking prongs, radially movable in response to first and second piezoelectric actuators, respectively, for clamping said stepping means in said support tube thereby providing a support with respect to which force is applied to said deformable mirror, and further including a piezoelectric extending means for altering the axial spacing of said first and second locking means, whereby the axial position of said gripping means may be varied by sequential energization of said first locking means, extending means and second locking means.

* * * * *